United States Patent [19]

Jackson et al.

[11] 4,329,314
[45] May 11, 1982

[54] METHOD AND APPARATUS FOR INSIDE FROSTING OF TUBING

[75] Inventors: Isaac S. Jackson, Greenwich; L. Nelson Tilford, North Argyle, both of N.Y.

[73] Assignee: Mallinckrodt, Inc., St. Louis, Mo.

[21] Appl. No.: 202,870

[22] Filed: Oct. 31, 1980

[51] Int. Cl.³ .............................................. B29F 3/08
[52] U.S. Cl. .................................... 264/519; 264/562; 264/566; 264/210.5; 425/72 R; 425/326.1; 425/378 R; 425/387.1; 425/388
[58] Field of Search ................................ 264/566–569, 264/210.2, 210.5, 209.1, 209.3, 209.4, 237, 348, 48, 560, 519, 562, 209.7; 425/72 R, 387.1, 326.1, 388, 379 R, 378 R; 128/348, 349 R

[56] References Cited

U.S. PATENT DOCUMENTS

| | | | |
|---|---|---|---|
| 3,088,167 | 5/1963 | Corbett | 425/72 R |
| 3,103,409 | 9/1963 | Bohres et al. | 425/379 |
| 3,129,461 | 4/1964 | Zavasnik et al. | 264/209.1 |
| 3,299,192 | 1/1967 | Lux | 264/209.1 |
| 3,311,681 | 3/1967 | Cherney et al. | 264/48 |
| 3,508,554 | 4/1970 | Sheridan | 128/348 |
| 3,538,210 | 11/1970 | Gatto | 264/209.4 |
| 3,560,600 | 2/1971 | Gliniecki | 264/209.1 |
| 3,724,976 | 4/1973 | Rode | 425/467 |
| 4,127,371 | 11/1978 | Luthra | 425/72 R |
| 4,255,381 | 3/1981 | Eustance et al. | 264/237 |

FOREIGN PATENT DOCUMENTS 1479973  3/1967  France .............................. 264/209.1

Primary Examiner—Jeffery R. Thurlow
Attorney, Agent, or Firm—Bernard, Rothwell & Brown

[57] ABSTRACT

Provision is made for evenly controlling the cooling of the inner die pin of an extrusion die assembly so that the hot plastic coming in contact therewith is frosted. A conduit extends through the inner die pin to a point near the tip of the inner die pin. A cap is mounted on the end of the conduit and spaced from the front face thereof to provide an annular discharge opening. At least the tip portion of the inner die pin is formed of a material of good heat conductivity, such as brass, and the cooling air is directed through the discharge opening relatively evenly over the inner portion of the inner die pin to effect uniform inside frosting of a plastic tube formed in the apparatus. The inside of the plastic tube is open to the atmosphere. To maintain proper size the extruded tube is directed from the extrusion die assembly into sizing plates in a vacuum sizing and cooling chamber wherein a lower than atmospheric pressure is maintained on the exterior of the tube, and coolant is supplied to the chamber so as to surround the exterior of the tube.

11 Claims, 3 Drawing Figures

U.S. Patent
May 11, 1982
4,329,314
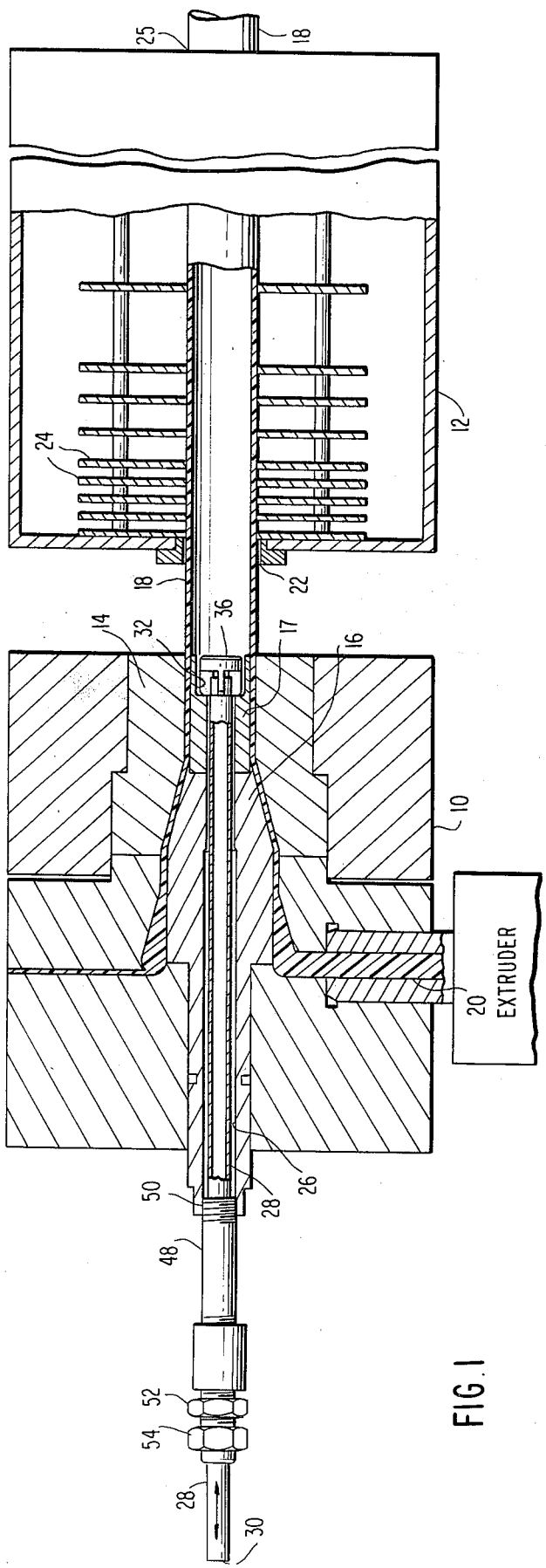
FIG. 1
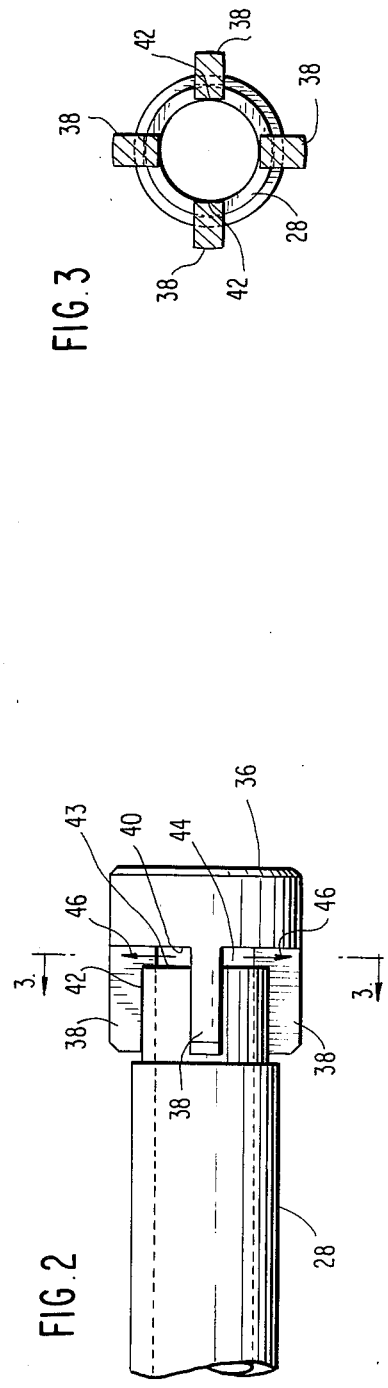
FIG. 3
FIG. 2

METHOD AND APPARATUS FOR INSIDE FROSTING OF TUBING

BACKGROUND OF THE INVENTION

1. Field of the Invention

This invention relates to a method and apparatus for inside frosting of tubing and particularly tubing intended for use in endotracheal applications where it is necessary that a suction catheter be passed down an endotracheal tube to remove secretions by suction.

2. Description of the Prior Art

In endotracheal applications, it is frequently necessary that a suction catheter be passed down a larger endotracheal tube. If the inside of the endotracheal tube has a shiny or glossy surface, passage of the suction tube therethrough becomes more difficult. Suction catheters are normally relatively soft and have a tendency to wedge between the walls of the endotracheal tube when being pushed around corners. A frosted surface reduces surface friction where the catheter and endotracheal tube touch.

The present invention is particularly directed to method and apparatus for effecting in a convenient and effective manner the inside frosting of a tube used in such endotracheal applications.

The frosting of tubing, both of the exterior and of the interior walls thereof, is of course known in the prior art. The present invention is directed to an improved method and apparatus for efficiently and effectively frosting the inside of a tube simultaneously with the extrusion forming of that tube, the frosting being accomplished by supplying coolant in a particular manner during the extrusion forming process.

The prior art shows arrangements for extruding tubing and simultaneously supplying cooling air. There are a number of examples in the prior art of arrangements for directing cooling air to both the interior and exterior surface of a tube during the extrusion process in order to achieve a smooth rather than a frosted surface. Thus, normally the prior art provides for directing cooling air or other coolant directly against the surface of the tubing itself and, as indicated above, for a purpose other than securing the frosting of the tubing.

The prior art also discloses an arrangement for cooling an inner die pin to effect frosting of the inside of a tube being extruded. However, in this prior art arrangement the inner die pin is cooled by conduits which are embedded therein and carry cooling fluid to and from a chamber at the forward end of the inner die pin. In this prior art arrangement, variation in temperature differential at the inner die pin is provided only by varying the amount and temperature of the cooling fluid supplied. No provision is made for varying the area at which the cooling fluid is applied. Further, this prior art arrangement is subject to uneven cooling of the inner die pin because of a cool spot at the entry side of the chamber and a warmer spot at the exit side of the chamber. In the applicants' arrangement not only is provision made for varying the area of impingement of cooling air on the inner die pin, but such cooling air is delivered uniformly over the entire inner circumference of the inner die pin to provide uniform cooling thereof. The prior art does not disclose, so far as the applicants are aware, the provision of a method and apparatus for securing inside frosting by cooling an inner die in the manner of the applicants' invention. By the present invention a convenient and effective arrangement is provided for effecting the frosting of the inside surface of a tube.

Accordingly, it is an object of this invention to provide an improved method and apparatus for effecting the inside frosting of a tube, and particularly of a tube used in endotracheal applications, simultaneously with and as part of apparatus for extruding the tube.

SUMMARY OF THE INVENTION

In carrying out the invention in one form thereof, apparatus is provided for extruding plastic material to form a tube, the material being extruded between an outer die bushing and an inner die pin. In accordance with this invention provision is made for evenly controlling the cooling of the inner die pin of an extrusion die assembly so that the hot plastic coming in contact therewith is caused to develop micro cracks, that is, to be frosted. In a specific embodiment, a conduit extends through the inner die pin to a point near the tip of the inner die pin. A cap is mounted on the end of the conduit and spaced from the front face thereof to provide an annular discharge opening. At least the tip portion of the inner die pin is formed of a material of good heat conductivity, such as brass, and the cooling air is directed through the discharge opening relatively evenly over the inner wall to effect uniform frosting. The inside of the plastic tube formed in the apparatus is open to the atmosphere. To maintain proper size of the extruded tube the tube is directed from the extrusion die assembly through sizing plates in a vacuum sizing and cooling chamber wherein a lower than atmospheric pressure is maintained on the exterior of the tube and coolant is supplied to the chamber so as to surround the exterior of the tube.

DESCRIPTION OF THE DRAWINGS

FIG. 1 is a view partly in section of apparatus incorporating an embodiment of this invention.

FIG. 2 is an enlarged sectional view of a portion of the apparatus shown in FIG. 1.

FIG. 3 is a view along the line 3—3 in FIG. 2.

DESCRIPTION OF THE PREFERRED EMBODIMENT

Referring to FIG. 1, the apparatus includes an extrusion die assembly 10 and a vacuum sizing and cooling chamber 12 disposed adjacent the discharge end of the extrusion die assembly. Details of the general structure of the extruder are not part of the present invention and any conventional apparatus for extruding plastic tubing may be employed. Similarly, details of the construction of the vacuum sizing and cooling chamber 12 are not part of the applicants' invention and this portion of the application has been illustrated only in elementary form. Any conventional vacuum sizing and cooling chamber, for example that shown and described in U.S. Pat. No. 3,538,210-Gatto, may be employed.

The extrusion die assembly 10 includes an outer die bushing 14 and an inner die pin 16. These elements are spaced to provide an annular passage through which the plastic employed to form a tube 18 is forced during the extrusion process. The plastic is supplied under pressure from an extruder (not shown) through an inlet cavity 20.

The tube formed in the extrusion die assembly is directed from the discharge end thereof into an opening 22 in the vacuum sizing and cooling chamber 12. Within the chamber there are provided a plurality of spaced sizing plates 24 each of which has a central opening of a diameter corresponding to the desired outside dimension of the tube 18. Suitable cooling liquid is supplied to the chamber 12 in sufficient quantity to surround the tube 18 so as to fully set the plastic before the tube exits from the discharge end 25 of the chamber. The interior of the chamber 12 is maintained at a subatmospheric pressure by means of a conventional vacuum pump connected thereto. Since the arrangements for supplying coolant and for providing the vacuum are conventional and are not part of the present invention, they have not been illustrated in the drawing.

In accordance with the present invention, apparatus is provided for effecting frosting of the inside of the tube in a uniform and effective manner. Such frosting, which is achieved by causing micro cracks to develop in the surface of the tube, is desirable for a number of applications, where the surface of one tube must move along the surface of a second tube. For example, a smaller catheter, such as a suction catheter, in being passed down an endotracheal tube may hang up or wedge, particularly when being pushed around corners, when the surfaces are glossy. In this case frosting one or both of the adjoining surfaces of the tubes has been found to greatly reduce the friction and facilitate passage of the suction catheter through the surrounding endotracheal tube.

In the apparatus and method of this invention, provision is made for directing cooling air in a particular manner against the inner surface of the inner die pin 16 near the tip thereof. While, within the scope of this invention, other fluids may be employed if desired, air is readily available and entirely satisfactory for the purpose and this is the fluid normally employed. In the preferred form of the invention shown, the inner die pin 16 is formed to include a tip portion 17 which is made of a material of good heat conductivity, preferably brass. A passage 26 is provided in the inner die pin 16, extending through the inner die pin to a point near the tip of the inner die pin. A conduit 28 is positioned within this passage and extends substantially the full length thereof. The conduit is adapted to be connected at one end 30 to a source of cooling air (not shown) at a pressure slightly above atmospheric. The forward end of the conduit 28 terminates adjacent the tip portion 17 of the inner die pin 16 and spaced inwardly from the tip thereof. In the form shown, the tip portion is made thinner at the forward end thereof, as indicated at 32, to increase the heat conductivity from the extruded tube through the inner die pin, and the conduit 28 terminates adjacent this thinner portion.

In order to direct the cooling air in the proper manner against the inner surface of the inner die pin 16 near the tip thereof a cap 36 is mounted on the end of the conduit 28, as shown most clearly in FIGS. 2 and 3. The cap 36 includes a plurality of projections or fingers 38 extending rearwardly from the inner surface 40 of the cap. The fingers 38 are positioned equidistantly about the inner surface of the cap. In the particular embodiment shown, four such fingers 38 are employed, but it will be apparent that a lesser or greater number could be employed if desired. The inner edges 41 of the fingers 38 are dimensioned so as to have a close fit with the outer surface 42 of the conduit 28. The cap 36 may be press fitted onto the conduit 28 but preferably it is bonded to the conduit in some conventional manner, for example, by soldering or welding.

As best shown in FIG. 2, the cap in its assembled position is spaced from the front face 43 of the conduit by some predetermined amount so as to provide a circumferential aperture 44 between the front face 43 of the conduit 28 and the inner surface of the cap 36. In the particular form of cap shown in FIG. 2, the gap between the front face 43 of the conduit 28 and the inner surface 40 of the cap 36 is 0.005 inch.

The conduit is positioned so that the air flowing through the aperture 44 is directed against the inner surface of the inner die pin 16 at a point near the tip of the tip portion 17. Because of the construction shown in FIG. 2, the air is directed substantially uniformly throughout the circumferential aperture 44 and hence this cooling air is directed substantially uniformly against the circumferential inner surface of the inner die pin 16. At least the tip portion 17 of the inner die pin is made of a material of good heat conductivity, preferably of a material such as brass which has this characteristic. Moreover, the tip portion 17, as described above, is made thinner in the region 32 toward which the air is directed so as to effect more rapid heat transfer. The cooling effect of the air striking the inner surface of the inner die pin 16 is, therefore, transmitted uniformly and quickly through the inner die pin 16 in the circumferential area indicated generally by the numeral 32 in FIG. 1. The resultant substantial and uniform cooling of the hot plastic causes the development of micro cracks in the inner surface thereof; this gives this surface a frosted condition and reduces the friction thereof.

While a particular shape of the cap 36 has been shown in FIG. 2, it will be apparent that other shapes can be employed if desired. For example, in lieu of forming the cap 36 with a central relatively flat portion, as shown in FIG. 2, the inner surface of the cap could be formed as a curved surface throughout to effect an easier change of direction of the air flowing through the conduit to the direction indicated by the arrows 46. Further, although, in the form shown in FIG. 2, the circumferential aperture 44 is illustrated being formed so that the air discharged therefrom is directed radially, this aperture could be formed if desired to provide for discharge in directions angled slightly forwardly or slightly rearwardly. The important thing from the standpoint of this invention is that the air be distributed uniformly throughout the circumference of the aperture 44 and that it be directed against the inner surface of the inner die pin 16 near the tip thereof, and that the inner die pin 16 be made of a material of good heat conductivity so that the heat is withdrawn quickly and uniformly from the plastic tube.

In order to provide for adjustment of the position where the cooling air discharged through the aperture 44 strikes the inner surface of the inner die pin 16, provision is made for lengthwise adjustment of the position of the conduit 28 which supports the cap 36. One form of such adjustment is shown in FIG. 1. This includes a pipe 48 which is threadedly engaged, as shown at 50, with the inner die pin 16 and supports the conduit 28 which extends through the pipe 48. Mounted on an externally threaded portion 52 of the pipe 48 is a nut 54 which is employed in effecting the lengthwise adjustment of the conduit 28. When the nut 54 is turned in one direction, it causes a compression collar to firmly engage the conduit 28, holding the conduit 28 and the cap 36 fixed in position. When the nut 54 is turned in the opposite direction it relaxes the compression collar so that the conduit may be moved forwardly or rearwardly to position the aperture 44 at the desired location relative to the tip portion 17 of the inner die member to secure the desired cooling effect and the desired frosting of the tube. After the adjustment has been made, the nut 54 is turned in the reverse direction to tighten the compression collar and hold the conduit in its adjusted position. The particular means for adjusting the position of the conduit, and hence the position of the aperture 44, is not critical and other arrangements for making this adjustment can be employed. The important aspect is that the point of application of the stream of cooling air can be easily adjusted so that optimum conditions are achieved for effecting frosting of the inside of the tube.

Thus, by the arrangement of this invention, the cooling fluid is caused to impinge in a uniform manner circumferentially along the inner surface of the inner die pin. Further, the inner die pin at the area of impingement has been made thinner, as shown at 32, for fast response in heat transfer. Also, at least the tip portion 17 of the inner die pin is made of a material of good thermal conductivity, such as brass, which further aids in fast response and in achieving uniform temperature over the circumference of the inner die pin. Finally, provision is made for easily adjusting the conduit 28 longitudinally to provide a very precise location of the area of impingement of the cooling fluid discharged from the conduit.

This improved operation achieved by the applicants' structure may be contrasted with a prior art arrangement in which the inner die pin is cooled by conduits which are embedded therein and carry cooling fluid to and from a chamber at the forward end of the inner die pin. Such an arrangement attempts to vary the temperature differential at the inner die pin by varying the amount and temperature of the cooling fluid supplied. Unlike the applicants' structure, this prior art arrangement provides no means for varying the location at which the cooling fluid is applied to the inner die pin. Moreover, it is subject to uneven cooling because of a cool spot at the entry side of the chamber and a warmer spot at the exit side of the chamber. By contrast, in the applicants' arrangement the cooling fluid is uniformly supplied through the circumferential aperture 44 around the entire inner circumference of the inner die pin 16.

In the invention of this application, a relatively large volume of cooling fluid must be introduced against the inner die pin and into the extruded plastic tube 18 to accomplish the internal frosting. Because of this large volume of cooling fluid, it is desirable that the tube 18 be open to the atmosphere at its end. If the end were closed and a large volume of cooling fluid were introduced into the extruded tube, the tube would expand like a balloon in the area just beyond the extrusion die assembly where the plastic is still in a molten state. However, even with the open end of the tube the amount of air pressure on the supply side is still somewhat higher than is desirable inside a molten tube. The pressure must be maintained at this somewhat higher level because of the volume of cooling fluid required to be supplied through the small gap provided by the aperture 44 at the end of the conduit 28. In order to eliminate inaccuracies which could occur in the size of the tube because of this internal pressure, and to insure that the tube is formed of the proper size, the vacuum sizing and cooling chamber 12 is employed and is positioned closely adjacent to the discharge end of the extrusion die assembly 10. The internal pressure within the tube 18 combined with a slight vacuum maintained in the chamber 12 externally of the tube 18 causes the wall of the tube to be urged against the sizing plates 24 to insure an accurate dimension thereof. The tube is cooled by the cooling liquid within the chamber 12 as it passes through the chamber so that it is set at the desired accurate dimension before being discharged from the discharge end 25 of the chamber 12. The combination of the sizing plates, the slight vacuum within the chamber 12 and the coolant therein results in a completed tube of accurate size.

The operation of the apparatus described above is as follows. Plastic material, properly heated, is supplied under pressure through the cavity 20 and forced between the outer die bushing 14 and the inner die pin 16 to form the tube 18. To effect frosting of the inner surface of the tube, cooling air is supplied from any suitable source through the conduit 28 and is directed through the circumferential aperture 44 in a uniform distribution against the inner surface of the inner die 16 near the tip thereof in the thinner region 32. Since at least the tip portion 17 of the inner die pin 16 is formed of a material, such as brass, of good heat conductivity and is made thinner in the area of impingement of the cooling air, heat is rapidly and uniformly transmitted therethrough from the hot plastic adjacent the exterior of the inner die pin 16 and the resultant cooling of the plastic develops micro cracks or frosting of the inner surface of the tube 18. In the continuous forming of tubing by means of the apparatus of this invention the end of the tube 18 is left open to the atmosphere so that the cooling air supplied from the conduit 28 is discharged through this open end. The pressure within the tube 18 because of the volume of cooling air supplied is above atmospheric. To assure accurate dimensions of the tube 18 the tube is caused to pass from the extrusion die assembly 10 through the adjacent vacuum sizing and cooling chamber 12; the slight vacuum maintained within this chamber 12, combined with the above atmospheric pressure within the tube 18, causes the wall of the tube to be pressed firmly against the sizing plates 24 disposed within the chamber 12. Because of the coolant in the chamber 12 the tube 18 will have set at the accurate size before leaving the chamber 12.

The frosting may be controlled by varying the temperature or the amount of the cooling air supplied, or both, and it may be further controlled by varying the area of impingement of this air on the inner die pin 16. Moreover, with the applicants' arrangement the control of sizing and the internal frosting are accomplished by two different means, and this is a primary reason for incorporating the vacuum sizing and cooling chamber with the internal frosting apparatus. It might be assumed that because of the open end of the tube 18, the frosting apparatus could be utilized effectively without the vacuum sizing and cooling chamber, but this could only be done with corresponding sacrifice of the degree of performance achieved with the applicants' arrangement. The reason for this is that a change in the amount of cooling air supplied for the internal frosting, and hence the change in the pressure within the tube 18, which might be utilized to secure optimum inside frosting, could adversely affect the sizing of the tube. With the vacuum sizing and cooling chamber employed in the applicants' arrangement, the level of vacuum therein can be varied independently of changes in the conditions utilized for affecting the internal frosting, and thereby compensate for any potential adverse effect of such changes in the internal frosting conditions on the size of the tube; that is, pressure in the chamber 12 external of the tube 18 can be "tuned in" with any variation in air pressure within the molten tube. Moreover, without the use of the vacuum sizing chamber, it would be essentially impossible to have an open end of the tube 18 because under some conditions at least the internal pressure would be too low to effect accurate sizing without provision of a slight vacuum on the exterior of the tube.

It can be seen that by the apparatus and method described above the tube 18 can be formed in a continuous manner and the inside frosting of the tube can be provided contemporaneously with the forming of a tube. The apparatus and method employed provides uniform cooling and thereby uniform frosting of the inner surface of tube 18. If it is desired for any reason to eliminate the frosting from any particular length of tubing during the continuous operation of the process it is necessary only to discontinue the flow of cooling air through the conduit 28. This may be accomplished in any conventional manner, for example by incorporating a manual or automatically controlled valve between the source of cooling air and the conduit 28.

While a specific embodiment of this invention has been shown and described, modifications of the particular structure shown and described can be made without departing from the spirit and scope of this invention. Also, while the invention has been described specifically in connection with the inside frosting of an endotracheal tube through which a suction catheter is passed, because it is particularly useful in such applications, it may also be employed in other applications where a frosted surface is necessary or desirable for ease of assembly. Accordingly, it is intended by the appended claims to cover all such modifications as come within the spirit and scope of this invention.

It is claimed:

1. In an extrusion die assembly for a plastic tube which includes an inner die pin and an outer die bushing and a passage therebetween through which plastic is extruded for forming the tube, means for providing inside frosting of the tube comprising:
   (a) a passage extending through said inner die pin;
   (b) a conduit positioned in said passage and extending through said inner die pin;
   (c) said conduit being connectible to a source of air under pressure;
   (d) at least the tip portion of said inner die pin being formed of a material having good heat conductivity; and
   (e) means at the inner end of said conduit for directing air uniformly against the inner surface of said tip portion for cooling said inner die pin to produce frosting of the inner surface of the tube;
   (f) the tube being open to the atmosphere so that air supplied through said conduit may be discharged through the open end of the tube.

2. The apparatus of claim 1 wherein tip portion of said inner die pin is formed of brass.

3. The apparatus of claim 1 including means for adjusting said conduit to vary the position of said means for directing air against said inner die pin.

4. The apparatus of claim 1 wherein said means for directing air comprises a cap received at the end of said conduit and positioned to provide an annular opening between the front face of said conduit and said cap for discharge of air uniformly against the inner circumferential surface of said inner die pin.

5. The apparatus of claim 4 wherein said cap includes an inner surface spaced from and parallel to said front face of said conduit to provide said annular opening.

6. The apparatus of claim 5 wherein said inner surface of said cap is substantially flat and air is discharged radially through said opening against said inner die pin.

7. The apparatus of claim 5 wherein said cap includes:
   (a) an inner surface shaped to direct air from said conduit outwardly against said inner die pin; and
   (b) a plurality of fingers spaced equidistantly around said inner surface and received on said conduit for positioning said cap on said conduit.

8. The apparatus of claim 1 wherein a vacuum sizing and cooling chamber is disposed between the extrusion die assembly and the open end of the tube and the tube extends through said chamber.

9. A method for frosting the inside surface of a tube simultaneously with the extrusion of the tube comprising:
   (a) providing an inner die pin at least the tip portion of which is formed of a material of good heat conductivity;
   (b) supplying air under pressure through a conduit extending to a point near the tip of said inner die pin;
   (c) directing the air uniformly against the inner surface of the tip portion of said inner die pin for cooling said inner die pin to induce frosting of the tube being extruded over said inner die pin; and
   (d) leaving the end of the tube open to allow escape of air therethrough.

10. The method of claim 9 including providing a vacuum sizing and cooling chamber adjacent the extrusion die assembly and causing the tube to pass through said chamber immediately after extrusion.

11. The apparatus of claim 1 wherein said tip portion of said inner die pin is made thinner than the remainder of said inner die pin to increase the heat conductivity from the extruded tube through the inner die pin.

* * * * *